US009876906B2

(12) United States Patent
Jassan

(10) Patent No.: US 9,876,906 B2
(45) Date of Patent: Jan. 23, 2018

(54) REMOTE CALL CENTER SYSTEM WITH REAL-TIME FEEDBACK

(71) Applicant: David Jassan, Mexico (MX)

(72) Inventor: David Jassan, Mexico (MX)

(73) Assignee: David Jassan (MX)

( * ) Notice: Subject to any disclaimer, the term of this patent is extended or adjusted under 35 U.S.C. 154(b) by 31 days.

(21) Appl. No.: 14/824,320

(22) Filed: Aug. 12, 2015

(65) Prior Publication Data

US 2016/0050319 A1 Feb. 18, 2016

Related U.S. Application Data

(60) Provisional application No. 62/036,271, filed on Aug. 12, 2014.

(51) Int. Cl.
*H04M 3/51* (2006.01)

(52) U.S. Cl.
CPC ....... *H04M 3/5125* (2013.01); *H04M 3/5158* (2013.01); *H04M 3/5183* (2013.01); *H04M 2203/2072* (2013.01); *H04M 2203/401* (2013.01)

(58) Field of Classification Search
CPC .... H04M 3/51; H04M 3/5125; H04M 3/5158; H04M 3/5183; H04M 2203/207; H04M 2203/401
USPC .................................................. 379/265.09
See application file for complete search history.

(56) References Cited

U.S. PATENT DOCUMENTS

| 7,933,387 | B1* | 4/2011 | Baker, IV | H04M 1/642 379/265.01 |
|---|---|---|---|---|
| 2005/0213743 | A1 | 9/2005 | Huet et al. | |
| 2005/0216551 | A1* | 9/2005 | Sirstins | H04M 3/493 709/202 |
| 2008/0298253 | A1* | 12/2008 | Walker | H04L 12/2602 370/241 |
| 2014/0177820 | A1 | 6/2014 | Odinak | |

* cited by examiner

*Primary Examiner* — Harry S Hong
(74) *Attorney, Agent, or Firm* — Grogran, Tuccillo & Vanderleeden, LLP

(57) ABSTRACT

This invention is a system and method for making remote calls linked to a call center, which is also capable monitoring the quality of the calls made by the sales agents at a call center. The sales agents can make the calls, without the need for a computer, using only a fixed or mobile telephone line from a remote station, which may be their home or elsewhere. The system includes a database with information of the customers and of the recorded calls made by the agents, a centralized call platform (CCP) with a server connected to the database, which concentrates in a virtual place all the calls made by the various agents and controls the numerical menus with the respective options through an automated interactive voice response (IVR) system that allows the platform to interact with an agent through the use of voice and touch input via keyboard, a plurality of remote call stations each with a fixed telephone line, and a central station or call center where the centralized platform is disposed.

9 Claims, 3 Drawing Sheets

REMOTE CALL CENTER SYSTEM WITH REAL-TIME FEEDBACK

CROSS-REFERENCE TO RELATED APPLICATION

This application claims the benefit of U.S. Provisional Application Ser. No. 62/036,271, filed on Aug. 12, 2014, which is herein incorporated by reference in its entirety.

This invention relates, in general, to a call center system and method, and more particularly, to a call center system and method that enables calling/sales agents to be housed in locales geographically remote from the centralized computer controller of the call center. Moreover, the call center system and method further enables monitoring of the quality of the calls made by the calling/sales agents at the call center, including the ability to integrate real-time feedback from the calling/sales agents in order to increase the efficiency of the call center system by selectively prioritizing subsequent calls made by the call center system.

BACKGROUND OF THE INVENTION

Known call centers typically utilize a large number of calling/sales agents at a single locale, each connected to a common, computerized system. The computerized system generates a series of outgoing calls, and directs these outgoing calls to one of the calling/sales agents (thereby acting as an incoming call to these calling/sales agents) when a real person answers the initial outgoing call made by the computerized system.

In this vein, document US2010210249 consists of a personal call center that can schedule calls for a user (i.e., a calling/sales agent), make the call at the scheduled time and connect to the user when the other party answers, making calls completely "hands-free" and transparent to the user. In essence, the system coordinates the outgoing calls and selectively connects these outgoing calls to one of the calling/sales agents to act as an incoming call, when and if the other party answers. Advantageously, the system can also be used by an administrator or a centralized call center to schedule the calls for a user or group of users. In this way, the managers or the call centers can schedule calls, between salespersons and customers.

In addition, document US2002035647 refers to the coordination of the information in the level based on the network between call centers connectable via a telecommunications network, such as the telephone network, and a network of packets, such as the Internet, creating better integration of and union between the interaction of a customer with a website and with a call center. Information about the customer and the customer's Web interaction are delivered to the call center's agent along with the call, leading to greater productivity and efficiency in the management of calls, and improved call routing. Calls can be sent to existing call centers based on information from the information of the experience on the Web, and the information of the user's Web interaction is shared with the call center.

Furthermore, there is also document US2007041551, which consists of a call management method in a call center service that informs and includes the followup of a series of calls that are received at the call service center. In addition, the method includes the transactions of surveillance services that are handled by a plurality of customer service agents. The method also includes the determination of a metric of the sales success of each of the plurality of customer service agents for each one of a plurality of offers of services and the classification of the customer service agents in terms of the success of the metric service for each of the plurality of the offer of services. In addition, the method includes the recording of the classification of customer service agents for each of the offers of services.

For its part, document US2007121905 provides a method and a device for carrying out telephone campaigns. By and large, unsuccessful calls to customers represent the biggest cost factor of telephone campaigns which the centers need to overcome. Apart from the costs of an occupied unsuccessful dialer, the costs of the connection fees are also evident, for example, in the case of connections that are immediately cut off again, or connections to answering machines. The method and the device provided herein improve the efficiency of telephone campaigns and saves resources in that the totality of the customers is no longer run through cyclically as a whole, but is divided into partial packets for central control. These partial packets are then simply run through for an established period of operation to conduct telephone campaigns, in particular advertising and sales campaigns.

Thus, as will be appreciated, these known systems incur great overhead and operational costs, as the calling/sales agents that are connected to the computer-aided controller are in the same geographical location, thereby requiring physical space, environmental controls and conditions and all the associated costs of supporting typically large numbers of calling/sales agents. Moreover, as typical calling/sales agents are only connected to the outgoing calls when a real person answers the outgoing calls, there is no ability for the calling/sales agents to increase the efficiency of the system as a whole.

The present invention therefore seeks to overcome these deficiencies by enabling large numbers of calling/sales agents to each be geographically, remotely located from the computer-aided control system of the call center, as well as from one another, while also permitting the real-time feedback of the calling/sales agents even in cases where a real person does not answer the initial outgoing call, thereby increasing the efficiency of the overall system. The present remote call center system may of course be utilized for any type of campaign, particularly campaigns for advertising, sales, debt collections, surveys, election campaigns, and the like.

SUMMARY OF THE INVENTION

It is an object of the present invention to provide a call center system.

It is another object of the present invention to provide a call center system that enables integration of multiple calling/sales agents, each which can be remotely located from both the call center itself, as we as from one another.

It is another object of the present invention to provide a call center system that integrates feedback from each of the connected calling/sales agents during each outgoing call placed by the call center controller, regardless of whether the initial outgoing call has been answered by a live person.

It is another object of the present invention to provide a call center system in which calling/sales agents can also make the calls without the need for an individualized computer at their respective locale, using only a fixed or mobile telephone line from a remote station that may be their home or elsewhere.

It is another object of the present invention to provide a call center system that permits each calling/sales agent to define each call for future processing, and because all calls are recorded and stored in a database it is ensured that adequate processing or follow-up is given to customers to achieve the objectives of the campaign and increase the efficiency of the system as a whole.

These and other objectives of the present invention, and their preferred embodiments, shall become clear by consideration of the specification, claims and drawings taken as a whole.

DETAILED DESCRIPTION

Figure 1:
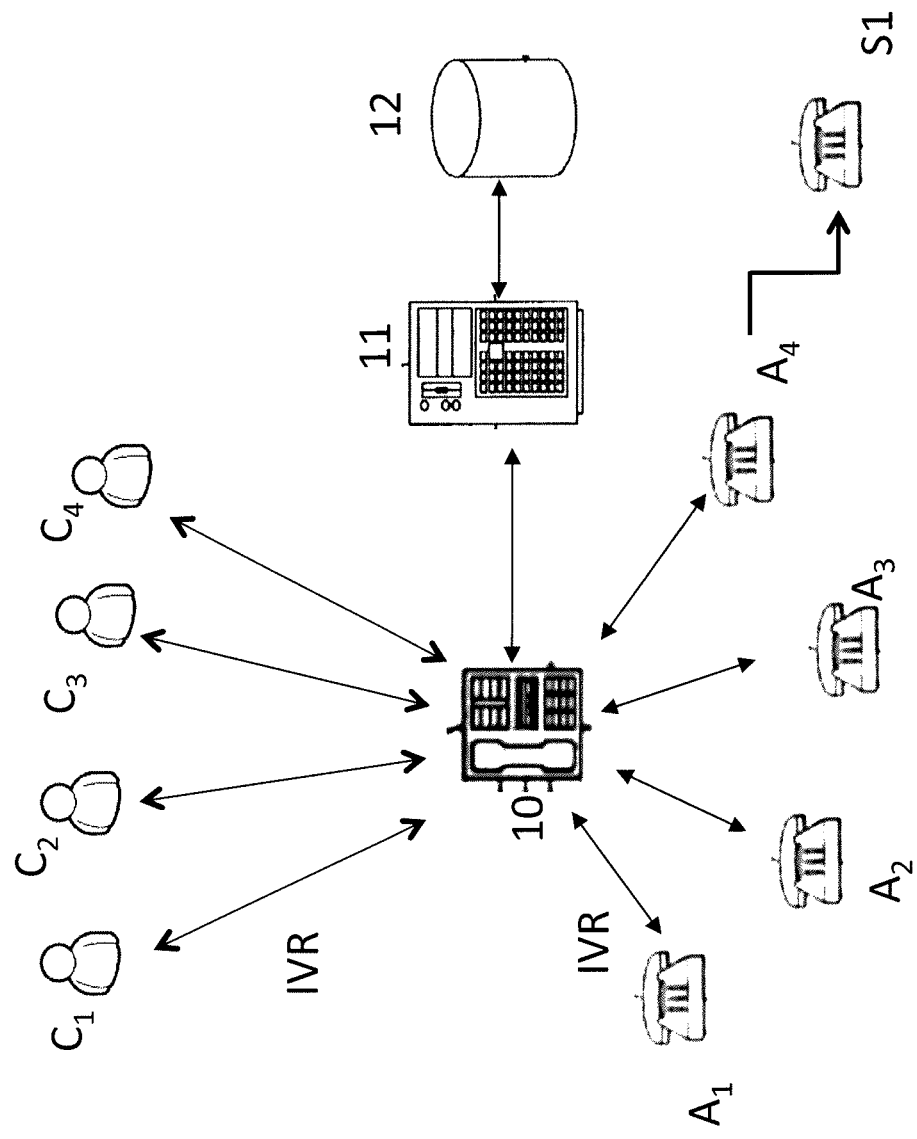
FIG. 1 is a diagram showing the system of the present invention.
Figure 2:
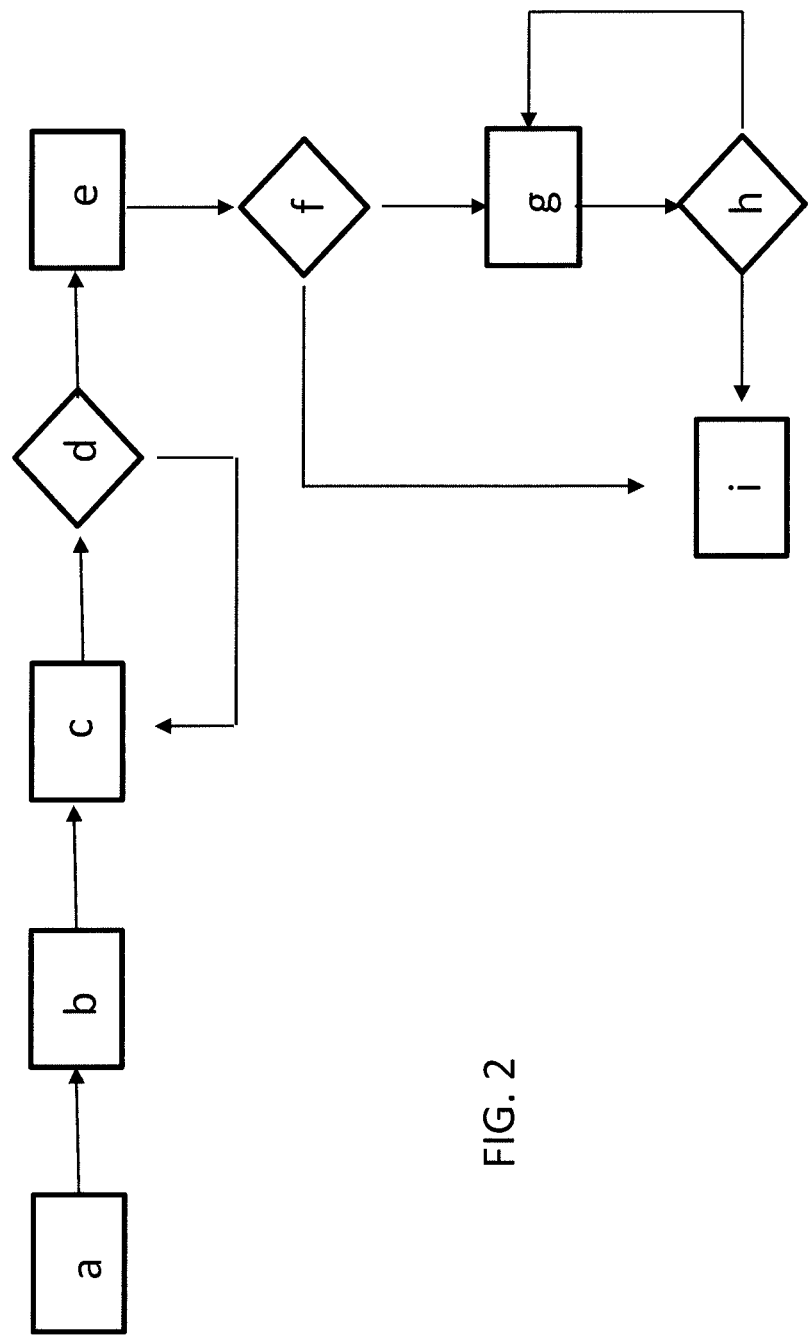
FIG. 2 is a flowchart showing the steps of the method for making calls of the present invention.
Figure 3:
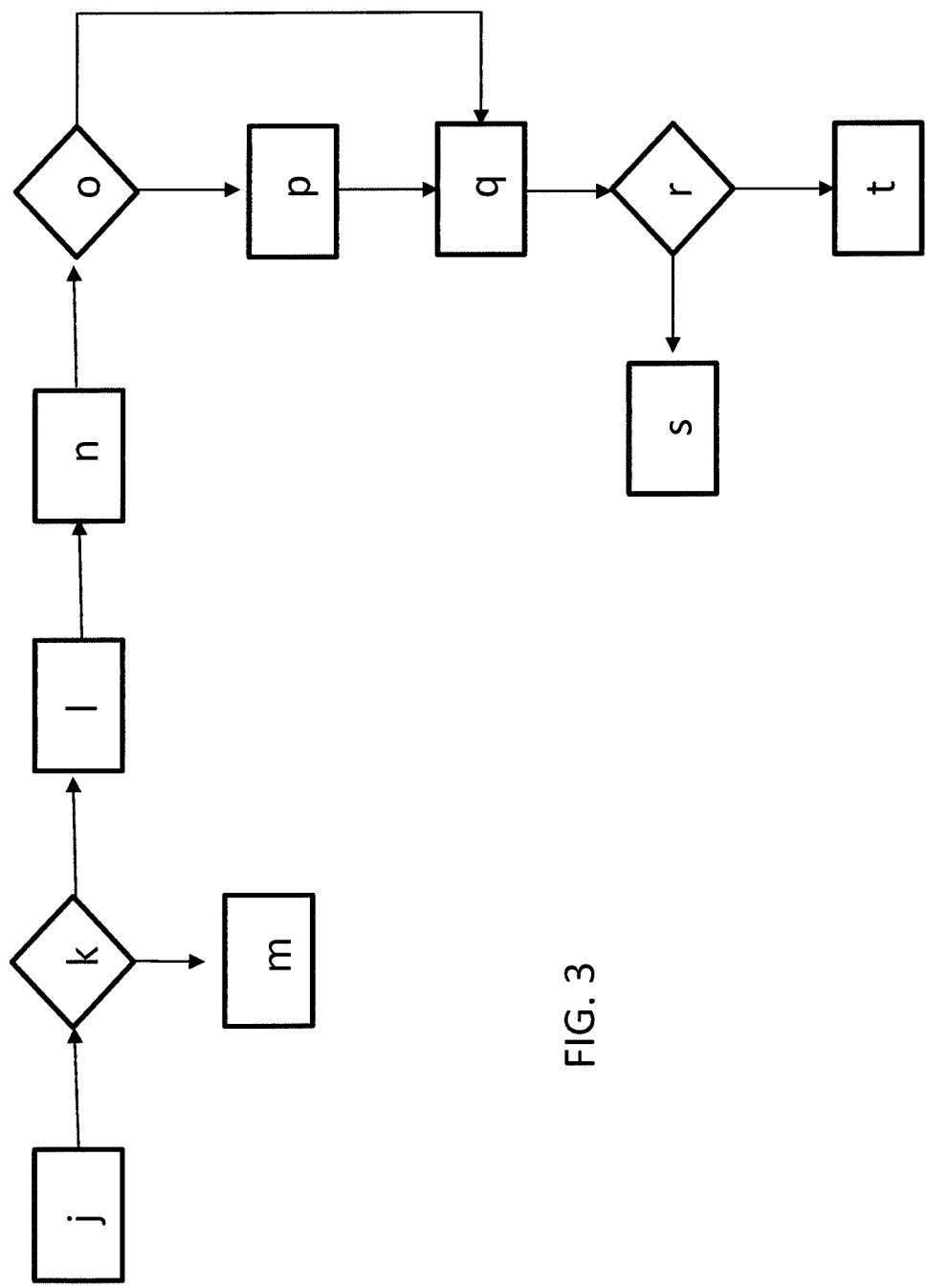
FIG. 3 is a flowchart showing the supplementary steps of the method for making calls of the present invention.

The call center system has the advantage that the sales or campaign agents are able to make calls to customers without the need for a computer using only a fixed or cellular line, such that the agent can work from home or anywhere with access to a fixed telephone line, this being a remote workstation from the call center.

This system comprises a database (12) with information of the customers and of the recorded calls made by the agents; a centralized call platform CCP (11) with a server connected to the database (12), which concentrates in one virtual place all the calls made by the different agents ($A_1$, $A_2$, $A_3$, $A_4$, etc.) and controls the numerical menus with the respective options effectuated by an automated interactive voice response (IVR), which allows the platform (11) to interact with an agent through the use of voice and touch input via keyboard; a plurality of remote call stations ($A_1$, $A_2$, $A_3$, $A_4$, etc.) each with a fixed telephone line; a central station or call center (10) in which is disposed the centralized platform (11).

The system also includes a customer relationship manager, which encodes the interactions between the agent and the end customer giving feedback on how to focus the sales agent to strengthen to increase productivity when contacting new customers.

The method for an agent to make remote calls linked to a call center of the present invention comprises the following steps:

a) A sales agent ($A_1$, $A_2$, $A_3$, $A_4$, etc.) dials the telephone number of a call center remotely from a fixed or mobile phone.

b) The respective telephone company links the call to the centralized call platform CCP (11) of the call center.

c) The centralized call platform CCP (11) through an automated interactive voice response (IVR) system asks the sales agent for a personal identification number (PIN).

d) The centralized call platform determines whether the PIN is correct.

e) If the sales agent types the correct PIN the centralized call platform CCP (11) updates the notifications relating to the agent's working day. If the agent's code (PIN) is incorrect the agent is required by the IVR to introduce it again and after three failed attempts the call is disconnected from the call center.

f) The centralized call platform determines if there are notifications from a supervisor for the sales agent g) If there are notifications the existence of messages is communicated to the agent via the IVR and these messages are transmitted, i.e., the CCP platform (11), via the IVR, informs the sales agent about the existence or nonexistence of any messages or notices left by a supervisor or hierarchical superior assigned to a voice mailbox assigned to the sales agent. If there are no notifications in voicemail, the telephone number of a customer chosen from a database is then dialed manually or automatically.

h) The centralized call platform via the IVR asks the agent through a menu of predetermined numerical options about hearing the messages in his or her voicemail again or dialing a customer's telephone number ($C_1$, $C_2$, $C_3$, $C_4$, etc.).

i) If the sales agent ($A_1$, $A_2$, $A_3$, $A_4$, etc.) chooses to access the dialing option, the CCP platform (11) starts manually or automatically dialing a phone number of a customer ($C_1$, $C_2$, $C_3$, $C_4$, etc.) selected from a database (12) to which the CCP platform (11) is connected; this CCP platform (11) chooses the customer ($C_1$, $C_2$, $C_3$, $C_4$, etc.) in a predetermined order or randomly from a database (12).

This CCP platform (11) determines whether the agent requires the customer's information before connecting and if so it gives the agent ($A_1$, $A_2$, $A_3$, $A_4$, etc.) the necessary information of the customer ($C_1$, $C_2$, $C_3$, $C_4$, etc.) from the database (12) via the IVR.

If the sales agent chooses to listen to his or her messages again the centralized call platform transmits the recording of the messages to him or her again.

j) The centralized call platform begins the recording of the call.

k) It is determined whether the agent's call successfully connects with the customer.

l) If the call from the agent ($A_1$, $A_2$, $A_3$, $A_4$, etc.) successfully connects to the customer ($C_1$, $C_2$, $C_3$, $C_4$, etc.), the agent offers the product or promotion to the customer.

m) If the call does not connect successfully, the agent, via the platform (CCP) categorizes the reason why the call did not connect successfully, identifying the cause through a menu of numerical options and ends the call; the CCP platform (11) detects the reason assigning a different numerical option for the potential causes, such as customer is unresponsive, line busy, no answer or wrong number.

n) After the agent offers the product to the customer, the agent categorizes the result via the IVR, i.e., once the agent speaks to the customer, the agent, via the IVR, selects the respective option from a menu of numerical options, identifying the result of the call; said numerical options menu that is provided by the platform (CCP) via the IVR includes for example the 3 key to identify a sale, the 4 key to determine that the customer is not interested in the offer, the 5 key to indicate that the customer should be called later, the 6 key to identify the existence of an answering machine, etc.; it should be noted that these numerical options are merely given by way of example, but they may vary.

o) The agent determines if it is necessary to record a voice memo in relation to the recently-made call.

p) If the agent selects the option to record a note, he or she records a voice message associated with the newly-made call so that a supervisor can access it latter. If the agent does not consider it necessary to leave a voice memo, he or she selects the numerical option to end the call. It is also possible that the agent may consider it necessary to transfer the call via the IVR menu to supervisor to give the customer additional information or just to record the successful sale.

q) The platform (CCP) ends the recording of the call and stores it in a database.

r) The call is considered ended and the agent enters a menu of numerical options via the IVR to select whether he or she wishes to exit the centralized call platform or whether he or she needs to begin dialing a telephone number of another customer in the database.

s) If the agent chooses to begin dialing a telephone number of another customer in the database, he or she goes back to step i).

t) If the agent chooses to exit the centralized call platform, he or she is automatically disconnected from the platform and the call is cut off from the telephone network.

Subsequently, the platform (CCP) automatically sends the recording of the call to a database with the information from the call and it is placed in an electronic portal, where a supervisor can consult the recorded calls in a database associated with an electronic portal.

In addition, the database where the recorded calls are stored can be the same database as the database of the customers or there can be two different databases.

It is noteworthy that the IVR gives the agent the numerical option at any moment to be directed to a help desk whenever the agent has any question or technical problem; in this case he or she will be redirected to a help desk where an operator will assist his or her call or to a voice message if the operator of the help desk is unavailable.

The system begins to function when agent ($A_1$, $A_2$, $A_3$, $A_4$, etc.) dials a telephone number to a central terminal of the call center (10). The central terminal (automatic operator) via the IVR prompts him or her for a code, key or extension, the agent types in the key and the operator gives him or her a menu of options such as: are you going to start work?, start dialing? The agent marks the option, the operator chooses a customer ($C_1$, $C_2$, $C_3$, $C_4$, etc.) from a database in a predetermined order or in random order as required. If the agent needs the customer's information, the operator provides information to the agent before dialing the customer, and the call is made to the customer, recording the conversation between the customer and the agent. Once the call ends the agent goes back to an options menu in which the automatic operator gives him or her the choice of the following options: sale, wrong number, no answer, does not accept the product, etc. The conversation between the agent and the customer is recorded and stored in a database of calls made. Once the call from the agent finishes, the customer is connected to a second operator which may or may not speak to the customer or may just register the sale or monitor the quality of the call.

Subsequently, a supervisor downloads and looks up the calls on an interactive portal; the agent may include voice memos for the supervisor after finishing speaking with the customer; the recording of the call includes details such as agent, date, time, call recording of the call, phone number of origin, recipient's phone number and its sends them to a database that makes them available to the supervisor or manager, so that the supervisor can carry out analysis or monitoring of the calls.

The centralized call platform (CPC) concentrates in one virtual place all the calls made by the various agents.

The automatic interactive voice response (IVR) system is a technology that allows a computer to interact with an agent through the use of voice and touch input via a keyboard.

The customer relationship manager (CRM) is a system that will encode the interactions between the agent and the end customer giving important feedback on where and how to focus the sales agent to strengthen to increase productivity when contacting new customers.

It will therefore be readily appreciated that the present call center system enables the cohesive integration of potentially multiple calling/sales agents, each of which may be located in geographically remote locations from both one another, and from the location of the CPC itself.

Moreover, the present invention enables the remote location of multiple calling/sales agents, without requiring that each remotely located calling/sales agent have their own computer with which to interact with the CPC.

The present invention therefore provides a system and method for operating a call center that removes much of the operational and overhead costs of typically known call centers, while maintaining the integrated essence of the call center itself.

It will also be readily appreciated that by permitting the real-time feedback from each individual calling/sales agent during each outgoing call, including those outgoing calls never answered by a live human, the present call center system dramatically increases the efficiency of the call center, including enabling the hierarchical categorization of outgoing calls so as to maximize the order and efficiency of subsequent calls by the CPC.

In addition to the benefits noted above, the present call center system enables a more robust review-and-comment feedback operation than known systems, and as such, provides for easier verification of compliance issues and the like. Moreover, it will be readily appreciated that additional functionality could be incorporated into the operation of the CPC, including the ability to 'blacklist' a given number, based upon the feedback from the calling agent, without departing from the broader aspects of the present invention. Amongst other possible attributes that are equally contemplated by the present invention is the ability for a calling agent to designate a particular number as a 'reserved' number, so that that number is only called/connected to that particular calling agent, for a predetermined period of time.

It is also possible for a calling agent to provide real-time feedback on each call, for later consideration by a supervisor, or to rate the actual, technical quality of the call, for follow-up by IT or engineering personnel.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A method for operating a call center system comprising the steps of:
   locating a centralized database repository and controller platform at a first geographic location;
   permitting selective electronic communication between said centralized database repository and controller platform, and an agent having a telephone, wherein said agent with said telephone is located in a second geographic location, said second geographic location being different and remote from said first geographic location;
   issuing outgoing calls from said centralized database repository and controller platform based upon a predetermined set of calling parameters, to connect said agent to a customer; and
   permitting real-time feedback from said agent during each of said outgoing calls;

wherein said telephone is the only equipment required for said agent to establish said selective electronic communication with said centralized database and controller platform.

2. The method for operating a call center system according to claim 1, further comprising the steps of:
with said centralized database repository and controller platform, through an interactive voice response system, prompting said agent for a personal identification number;
with said centralized database repository and controller platform, determining whether said personal identification number is correct;
if said personal identification number is correct, updating notifications relating to said agent; and
if said personal number is incorrect, prompting said agent for said personal identification number a second time;
wherein after three failed attempts to correctly enter said personal identification number, said electronic communication between said centralized database repository and controller platform, and said agent, is disconnected.

3. The method for operating a call center system according to claim 2, further comprising the steps of:
utilizing said centralized database repository and controller platform, determining if notifications form a supervisor of said agent are stored in said centralized database repository and controller platform;
communicating the existence of said notifications to said agent through said interactive voice response system; and
if there are no notifications, dialing a telephone number of a customer randomly chosen from a database.

4. The method for operating a call center system according to claim 3, further comprising the steps of:
dialing a telephone number of a customer selected from a database to which said centralized database repository and controller platform is connected;
with said centralized database repository and controller platform, determining whether said agent requires customer information before connecting; and
of said agent requires said customer information, providing said customer information to said agent from said database via said interactive voice response system.

5. The method for operating a call center system according to claim 1, further comprising the steps of:
permitting said real-time feedback from said agent during each of said outgoing calls even when said outgoing calls are not answered or connected; and
ending said outgoing calls that are not answered or connected;
wherein said real-time feedback for said outgoing calls that are not answered or connected includes categorization of a reason why said outgoing calls are not answered or connected, including identifying said reason through a menu of numerical options.

6. The method for operating a call center system according to claim 5, further comprising the steps of:
permitting said agent to record a note, including recording a voice message;
wherein if said agent does not elect to record said voice message, said agent elects a numerical option to end said outgoing call;
wherein said an interactive voice response system is further configured to permit said agent to transfer a call to a supervisor.

7. The method for operating a call center system according to claim 1, further comprising the steps of:
permitting said real-time feedback from said agent during each of said outgoing calls even when said outgoing calls are not answered or connected.

8. A remote call center system, comprising:
a centralized database repository and controller platform located at a first geographic location, said centralized database repository and controller platform including a database having a list of customers;
an interface of said centralized database repository and controller platform to selectively permit bi-directional communication with an agent located at a second geographic location, said second geographic location being different and remote from said first geographic location; and
an interactive voice response system integrated with said centralized database repository and controller platform allowing said agent to communicate with said centralized database repository and controller platform;
wherein said agent only needs a telephone to communicate with said centralized database repository and controller platform; and
wherein said agent provides real-time feedback through said interface regarding calls issuing from said centralized database repository and controller platform, said calls issuing based upon a predetermined set of calling parameters.

9. A method for an agent to make remote calls linked to a call center, comprising the steps of:
permitting an agent to dial a telephone number of said call center remotely from one of a fixed and a mobile phone, said agent and said call center being located at different geographic locations;
authorizing access to a centralized call platform of said call center through an automated interactive voice response system after said automated interactive voice response system confirms said agent's personal identification number;
initiating a dialing of a telephone number of a customer selected from a database of said centralized call platform, in accordance with a predetermined set of calling parameters; and
permitting said agent to offer feedback to said centralized call platform with respect to each of said dialed telephone numbers of said customers, whether said customers answer said dialed telephone numbers.

* * * * *